United States Patent Office 3,694,407
Patented Sept. 26, 1972

3,694,407
EPOXY-CONTAINING CONDENSATES, THEIR PREPARATION AND USE
Robert R. Krikorian, Moorestown, N.J., assignor to Shell Oil Company, New York, N.Y.
No Drawing. Filed Aug. 11, 1970, Ser. No. 63,029
Int. Cl. C08g 30/04
U.S. Cl. 260—47 EP                                 10 Claims

ABSTRACT OF THE DISCLOSURE

Epoxy-containing condensates having high functionalities, i.e., greater than two, and exhibiting improved elevated temperature performance, are described. These solid, fusible, acetone-soluble epoxy-containing condensates are prepared by reacting (1) a polyepoxide possessing more than one vic-epoxy group, and preferably a liquid glycidyl polyether of a polyhydric phenol, with (2) a special polyhydric phenol, such as an alpha,alpha,omega,omega-tetrakis(hydroxyphenyl)alkane, in the presence of an organic phosphine or hydrocarbon phosphonium halide. The use of these condensates in molding formulations and the like are also described.

BACKGROUND OF THE INVENTION

Polyepoxides, such as commercially available glycidyl ethers of polyhydric phenols, have been used with considerable success in the past in the preparation of laminates, adhesives, powdered coatings and the like. Their use in these applications, however, has been limited in the past months because of the trend toward more heat resistant products and faster curing systems. The laminates prepared from these resins, for example, fail to retain a great part of their strength at the elevated temperatures of 225–250° F. In addition, the system fail to cure at elevated temperatures in a matter of a few minutes, which shortened time is required for many new assembly line coating applications.

It is an object of the invention, therefore, to provide a new class of epoxy resins and a method for their preparation. It is a further object to provide new epoxy-containing condensates that can be used to form products having outstanding heat resistance.

SUMMARY OF THE INVENTION

It has been discovered that acetone-soluble, solid, epoxy-containing condensates can be prepared by reacting (1) a polyepoxide possessing more than one vic-epoxy group, and preferably a glycidyl polyether of a polyhydric phenol, and more preferably a liquid glycidyl polyether of 2,2-bis(4-hydroxyphenyl)propane, with (2) an alpha,alpha,omega,omega-tetrakis(hydropyhenyl)alkane in the presence of an organic phosphine or hydrocarbon phosphonium halide. It has further been discovered that these new condensates represent a new series of high functionality epoxy resins which exhibit new and unexpectedly improved properties making these condensates ideally suited for many applications, including fluidized bed powder, molding powders, laminating resins, etc. For example, these novel epoxy-containing condensates exhibit improved thermal properties, e.g., heat distortion temperatures of >150° C. in molding powder formulations using imidazole compound curing agents. In electrical laminating applications, improved 225° F. flexural strengths are obtained. These novel condensates can also be cured with conventional epoxy curing agents, such as aromatic amines and anhydrides, to produce insoluble, infusible compositions, which make them especially suitable for molding powder formulations.

DESCRIPTION OF THE PREFERRED EMBODIMENT

The polyepoxides that can be used in the process comprise those organic materials which have more than one vic-epoxy group, i.e., more than one

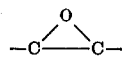

group, which group may be in a terminal position, i.e., a

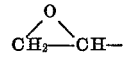

group or in an internal position, i.e., a

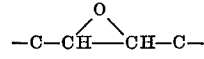

The polyepoxides may be saturated or unsaturated, aliphatic, cycloaliphatic, aromatic or heterocyclic, and may be substituted with substituents, such as chlorine, hydroxyl group, ether radicals, and the like.

Examples of suc hpolyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenols with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), bis(4-hydroxyphenyl)sulfone (Bisphenol S), 2,2-bis(4-hldroxyphenol)butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin, one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for seven hours to effect the reaction and the product is then washed free of salt and base.

The preparation of four suitable glycidyl polyethers of dihydric phenols is illustrated in U.S. 2,633,458 and are designated Polyethers A, B, C, and D.

Another group of polyepoxides comprises the polyepoxy polyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inosito, trimethylolpropane, bis(4 - hydroxycyclohexyl)dimethylmethane and the like.

The preparation of suitable polyepoxide polyether is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4, and a molecular weight between 30 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soybean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)ocalate, di(2,3-epoxyhexyl)succinate, di(2,3-epoxyoctyl)tetrahydrophthalate, di(4,5-epoxydodecyl)maleate, di(2,3-epoxybutyl)terephthalate, di(2,3 - epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups includes epoxidized esters of unsaturated alcohols and unsaturated carboxylic acids, such as 2,3-epoxybutyl 3,4 - epoxypentanoate, 3,4 - epoxyhexyl 3,4 - epoxypentanoate, 3,4-epoxycyclohexyl 3,4-cyclohexanoate, 2,3-epoxycyclohexylmethyl 2,3 - epoxycyclohexanoate, and 3,4-epoxycyclohexyl 4,5-epoxyoctanoate and the like.

Another group of materials having internal epoxy groups includes epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,12,13 - diepoxyeicosanedioate, dibutyl 7,8,11,12 - diepoxyoctadecanedioate, di-octyl 10,11 - diethyl - 8,9,12,13 - diepoxylicosanedioate, dicyclohexyl 3,4,5,6 - diepoxycyclohexanedicarboxylate, dibenzyl 1,2,4,5-diepoxycyclohexane - 1,2 - dicarboxylate and diethyl 5,6,10,11-diepoxyoctadecyl succinate.

Still another group comprises the epoxidized polyesters obtained by reacting unsaturated polyhydric alcohol and/or unsaturated polycarboxylic acid or anhydride groups, such as, for example, the polyester obtained by reacting 8,9,12,13-eicosadiendioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons such as epoxidized 2,3-bis(cyclohexenyl)propane, 2,2-bis(cyclohexenyl)butane, 8,10-octadecadiene and the like.

Polyepoxides having an epoxy equivalent weight between 400 and 4000 are preferred. Polyepoxides having an average molecular weight between 400 to 1000 are particularly preferred.

The other component to be used in making these novel condensates includes certain special polyhydric phenols, i.e., resorcinol, phloroglucinol and the alpha,,alpha,omega, omega-tetrakis(hydroxyaryl)alkanes. Especially superior precondensates are obtained with the alpha,alpha,omega, omega-tetrakis(hydroxyphenyl)alkanes, particularly 1,1, 2,2-tetrakis(hydroxyphenyl)ethane, sometimes referred to herein simply as tetraphenylolethane (TPE), and is therefore preferred.

A variety of polyhydric phenols, particularly the tetraphenols, can be employed in preparing the condensates of the present invention, although the preferred phenols are the alpha,alpha,omega,omega-tetrakis(hydroxyaryl)alkanes. Representative compounds include 1,1,2,2-tetrakis(hydroxyphenyl)ethane;
1,1,3,3-tetrakis(hydroxyphenyl)propane;
1,1,4,4-tetrakis(hydroxyphenyl)butane;
1,1,5,5-tetrakis(hydroxyphenyl)-3-methylpentane;
1,1,4,4-tetrakis(hydroxyphenyl)-2-ethylbutane;
1,1,8,8-tetrakis(hydroxyphenyl)octane;
1,1,10,10-tetrakis(hydroxyphenyl)decane;

and the like, as well as the corresponding compounds containing neutral substituent groups in the chain, such as 1,1,3,3-tetrakis(hydroxyphenyl)-2-chloropropane;
1,1,3,3-tetrakis(hydroxyphenyl)-2-nitropropane;
1,1,4,4-tetrakis(hydroxyphenyl)-2,3-dibromobutane;
1,1,6,6-tetrakis(hydroxyphenyl)hexanol-2, etc. Other suitable tetraphenols include those having substituted hydroxyphenyl groups as well as polynuclear hydroxyaryl groups such as 1,1,2,2-tetrakis(2-hydroxy-5-methylphenyl)ethane;
1,1,3,3-tetrakis(4-hydroxy-2,6-ditertiarybutylphenyl) propane;
1,1,6,6-tetrakis(3-chloro-4-hydroxyphenyl)hexane;
1,1,4,4-tetrakis(2-hydroxynaphthyl)butane and the like.

The tetraphenols used in preparing the present condensates are a known class of compounds and are readily obtained by condensing the appropriate dialdehyde with the desired phenol.

This condensation is effected by mixing the phenol and the dialdehyde together using a substantial excess of the phenol over the stoichiometric proportions of four moles of the phenol per mole of dialdehyde, saturating the mixture with hydrogen chloride, allowing the mixture to react for several days, and removing the unreacted phenol as by distillation, for example. The phenols condense with a dialdehydes so that the terminal carbon atom is linked to a nuclear carbon atom of the phenol, which nuclear atom is normally in a position from the class consisting of 2 and 4 with respect to the phenolic hydroxyl group.

The condensates are prepared by combining one or more of the above described polyepoxides with the polyhydric phenol, in the presence of a suitable catalyst.

Suitable catalysts include the organic phosphines and the hydrocarbon phosphonium halides.

Preferred phosphines are the organic phosphines, i.e., compounds of the formula $$P(R)_3$$

wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trixlyl phosphine, trinaphthyl phosphine, tricyclohexenyl phosphine, tri(3,4-diethyloctyl)phosphine, trioctadecyl phosphine, dioctyldecyl phosphine, dicyclohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

A particularly good catalyst is triphenylphosphine and is the preferred catalyst.

Preferred phosphonium halides are those conforming to the formula

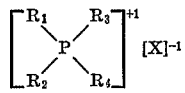

wherein X is a halogen atom, and $R_1$, $R_2$, $R_3$ and $R_4$ are the same or different and represent hydrocarbon residues which may or may not be substituted by one or more functional groups, such as halogen atoms. These phosphonium halides may generally be prepared by mixing in approximately equimolar proportions a phosphine with a halide. The mixing may be carried out with or without the application of heat, alone or in the presence of an inert solvent such as, for example, diethylether, benzene, chloroform or carbon tetrachloride.

Preferred phosphines for preparing the above-noted phosphonium halides include those phosphines noted hereinbefore.

Compounds to be mixed with the phosphine in the preparation of the phosphonium halide catalyst include organic halides.

Preferred organic halides are those wherein the organic radical is a hydrocarbon radical, preferably having from 1 to 10 carbon atoms. Examples of preferred organic halides include methyl chloride, ethyl chloride, methyl bromide, ethyl bromide, methyl iodide, ethyl iodide, propyl iodide, n-butyl iodide, sec-butyl iodide and n-decyl iodide.

Examples of the above-noted phosphonium catalysts include, among others, methyl triphenyl phosphonium iodide, ethyl triphenyl phosphonium iodide, propyl triphenyl phosphonium iodide, n-butyl triphenyl phosphonium iodide, iso-butyl triphenyl phosphonium iodide, sec-butyl triphenyl phosphonium iodide, n-pentyl triphenyl phosphonium iodide, n-decyl triphenyl phosphonium iodide, methyl tributyl phosphonium iodide, ethyl tributyl phosphonium iodide, propyl tributyl phosphonium iodide, methyl triphenyl phosphonium chloride, ethyl triphenyl phosphonium chloride, propyl tributyl phosphonium iodide, n-butyl triphenyl phosphonium chloride and ethyl triphenyl phosphonium bromide.

To illustrate the way in which these phosphonium catalysts are prepared, an example is given for the preparation of ethyl triphenyl phosphonium iodide. 52 gr. of triphenyl phosphine was dissolved in 100 ml. benzene and 32 gr. of ethyl iodide was added slowly. The mixture was refluxed for 4 hours and then the white precipitate was filtered off and dried. 63 gr. of ethyl triphenyl phosphonium iodide was obtained having a melting point of 161–162° C.

The amount of catalyst will vary over a wide range. In general, the amount of catalyst will vary from about 0.001% to about 10% by weight, and preferably from about 0.05% to about 5% by weight of the reactants.

In order to obtain the desired adducts (precondensates) instead of a gelled mass, it is necessary that proper proportions of polyepoxide and the alpha,alpha,omega,omega-tetrakis(hydroxyphenyl)alkane, i.e., (TPE), be used. In general, the present novel condensates are obtained when the epoxy to phenolic hydroxyl ratio of the reactants is greater than 2.5 and preferably about 2.6 to 2.8.

The temperature employed in the preparation of these condensates may vary from about 20° C. to 250° C., and more preferably from about 20° to 150° C. It is generally preferred to initiate the condensation at low temperature, e.g., ambient to 110° C. and allow it to exotherm to a temperature of 150° C. to 250° C. Cooling may be applied as required or desirable.

The reaction is preferably effected under atmospheric pressure, although superatmospheric or subatmospheric pressures may be utilized as desired.

Solvents or diluents may be employed in the reaction if desired, but in most cases one or more of the reactants will be liquid and mixing can be effected without the use of solvents. Suitable solvents include xylene, benzene, cyclohexane, doxane, diethyl ether, etc.

The condensate may be recovered from the reaction mixture by suitable means. If solvents or diluents are employed, they may be removed by evaporation, distillation, and the like. In the absence of such solvents or diluents, the condensate is generally recovered and used as the crude reaction product.

The condensates prepared by the process of the present invention will be solid products having a softening point of at least 50° C. and more preferably 75° C. to 140° C., as determined by the Hercules method. The condensates will also have a WPE value of at least 340 and preferably 340 to 390. The term "WPE" is the weight in grams of the condensate needed to supply 1 epoxy group.

A very special embodiment of the present invention is directed to the preparation of epoxy-containing adducts or condensates, wherein a more conventional phenol is added to the reaction mixture in addition to the above-noted special phenols. In general, up to about 20% of the special tetraphenol can be replaced with other phenols on an equivalent basis. It is essential, however, to produce the present special condensates, to utilize amounts of reactants so that the epoxy to phenolic hydroxyl ratio is at least 2.5. Also, preferably, the overall epoxide functionality should be below 3 epoxides per mole. One skilled in the art can conveniently determine the various weight ratios of reactants to reduce possible gelation by use of the Flory Gel Equation.

Other phenols which may be used in the process of the invention, in addition to the special phenols, include those compounds possessing at least one OH group attached to an aromatic nucleus. The phenols may be monohydric or polyhydric and may be substituted with a great variety of different types of substituents. Examples of the phenols include, among others, phenol, o-cresol, m-cresol, p-cresol, carvacrol, thymol, chlorophenol, nitrophenol, dinitrophenol, picric acid, pyrocatechol, hydroquinone, pyrogallol, hydroxyhydroquinone, 2,2-bis(4-hydroxyphenyl)propane, 2,2-bis(4-hydroxyphenyl)pentane, 2,2-bis(4-hydroxyphenyl)pentanoic acid, 2,2-bis(4-hydroxyphenyl)sulfone, 2,2-bis(4-hydroxyphenyl)methane, 2-methoxyphenol, 2,4-dibutoxyphenol, 2,5-dichlorophenol, 3-acetoxyphenol, 2,2-bis(3-allyl-4-hydroxyphenyl)propane, 2,2-bis(3-isobutyl-4-hydroxyphenyl)pentane, and the like, and polymeric type polyhydric phenols obtained by condensing monohydric or polyhydric phenols with formaldehyde, as well as phenols of the formulae

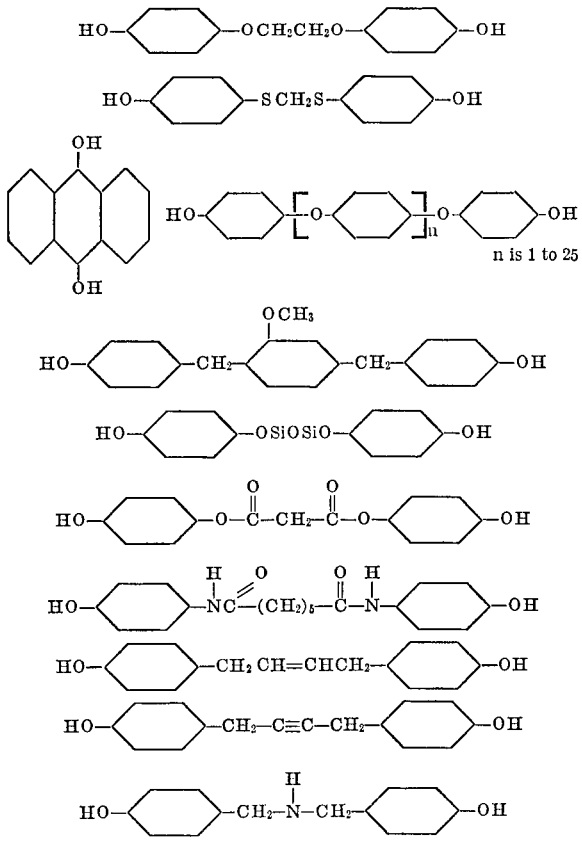

n is 1 to 25

Preferred phenols to be used are the polyhydric phenols containing from 2 to 6 OH groups and up to 30 carbon atoms. Coming under special consideration are the phenols of the formula

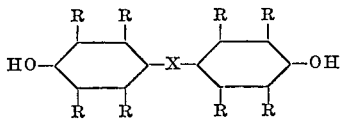

wherein X is a polyvalent element or radical and R is a member of the group consisting of hydrogen, halogen and hydrocarbon radicals. The preferred elements or radicals represented by X are oxygen, sulfur, —SO—, —SO$_2$—, bivalent hydrocarbon radicals containing up to 10 carbon atoms, and oxygen, sulfur and nitrogen-containing hydrocarbon radicals, such as

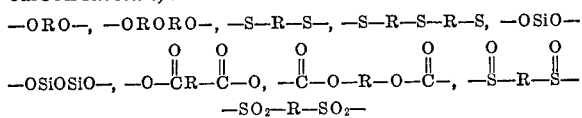

radicals wherein R is a bivalent hydrocarbon radical.

The preferred phenol, however, is bisphenol A and its halogenated derivatives such as tetrabromo-bisphenol A, as well as bis(4,4'-hydroxyphenyl)sulfone.

The epoxy-containing adducts prepared by the novel process of the invention are highly reactive and can also be cured with epoxy resin curing agents to form hard insoluble infusible products. Curing agents that can be utilized include, among others, amines, amino-containing polymers, polybasic acids, acid anhydrides, salts, mercaptans, hydrazines, BF$_3$ gas, BF$_3$-complexes, and the like, and mixtures thereof. Specific examples of such materials include, among others, p-phenylene diamine, diamino- phenyl-sulfone, p,p'-methylene dianiline, p,p-diaminophenyl-methane, triaminobenzene, 2,4-diaminotoluene, tetraaminobenzene, 3,3'-diamino diphenyl, 1,3-diamino-4-isopropylbenzene, 1,3-diamino-4,5-diethylbenzene, diaminostilbene, triethylamine, ethylene diamine, diethylamine, diethylene triamine, triethylene tetramine, tetraethylene pentamine, pyridine, diaminopyridine, piperidine, N,N'-diethyl-1,3-propane diamine, dicyandiamide, melamine, fatty acid salts of amines, such as the 2-ethylhexoate of tris(dimethylaminomethyl)phenol adducts of polyepoxides such as those described hereinafter, and the above-described mono- and polyamines, as the adduct of p-phenylene diamine and styrene oxide, the adduct of p-phenylene diamine and allyl glycidyl ether, the adduct of diglycidyl ether of 2,2-bis(4-hydroxyphenyl)propane and diethylene triamine, the adducts of diethylene triamine and ethylene oxide, the adduct of diethylene triamine and styrene oxide, the adducts of polyamines and unsaturated nitriles, such as the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

Other examples include the amino-containing polyamides as described in U.S. Pat. No. 2,540,940 and the monomeric amides described in U.S. Pat. No. 2,832,799.

Other examples include the acid anhydrides, such as phthalic anhydride, succinic anhydride, dodecenylsuccinic anhydride, maleic anhydride, tetrahydrophthalic anhydride, pyromellitic anhydride, hexachlorophthalic anhydride, methyl Nadic anhydride, anhydrides obtained by reacting maleic anhydride with unsaturated compounds, such as oils, terpinene, long chain unsaturated acids and the like as well as anhydrides obtained by reacting long chain acids with acetic anhydride and the like.

Still other examples include the salts, such as magnesium perchlorate, zinc fluoborate, potassium persulfate, copper fluoborate, cupric arsenate, zinc persulfate, cupric fluosilicate, cupric iodate, cupric sulfate, magnesium phosphate, stannic fluoborate, zinc nitrate, and the like, as well as the chloride derivatives as aluminum chloride, zinc chloride, ferric chloride and the like.

Still other examples include BF$_3$ gas and the BF$_3$ adducts with various materials, such as amines, amides, ethers, phenols and the like.

A preferred group of curing agents which also function as accelerators for other catalysts include 3-amino pyridine and the imidazole compounds and their salt derivative, such as, for example, 2-ethyl-4-methyl imidazole, benzimidazole, imidazole lactate, imidazole acetate, imidazole adipate, imidazole phthalate, imidazole tartrate, and the like.

As the condensates can be cured by heat alone, the amount of the curing agents employed will vary over a wide range depending on cure cycle desired, properties desired and economics. The amount of the curing agents having active hydrogen as well as the agents such as acid anhydrides are preferably employed so as to furnish at least 0.6 equivalent, and still more preferably 0.8 to 1.5 equivalent agents, per equivalent of the polyepoxide. As used herein in relation to the amount of curing agent, "equivalent" means that amount needed to furnish 1 active hydrogen or epoxy group per epoxy group. The other curing agents, such as metal salts, tertiary amines, BF$_3$, and the like are preferably used in amounts varying from about .1% to 6% by weight of the material being cured.

The new epoxy-containing adducts can be utilized for a great many different applications, such as in preparation of moldings, castings, pottings, coatings and impregnating compositions, laminates, filament winding operations, and the like.

It is sometimes desirable to utilize accelerators (catalysts) in combination with the above-noted curing agents. It will be appreciated that many compounds, such as amines and imidazole compounds and their salts, depending on relative amounts, may be employed as curing agents or as accelerators for other curing agents.

Suitable accelerators (catalysts) for use in the present process include the stannous salts of monocarboxylic acids, lithium benzoate, certain heterocyclic compounds such as the imidazole and benzimidazole compounds and salts thereof, tertiary amine borates, and tertiary amines among others.

Suitable stannous salts are the stannous salts of monocarboxylic acids having at least 5 carbon atoms, preferably fatty acids containing from about 5 to about 20 carbon atoms and more preferably from about 6 to 12 carbon atoms. Preferred stannous salts are stannous caproate, stannous octoate, stannous laurate, stannous palmitate, stannous stearate, stannous oleate, and stannous naphthenate.

Suitable heterocyclic compounds possessing in the heterocyclic ring (1) a substituted $>C=N-C<$ group and (2) a secondary amino group, i.e., an $=N-H$ group, include the imidazoles, such as the substituted imidazoles and benzimidazoles having the structural formulae:

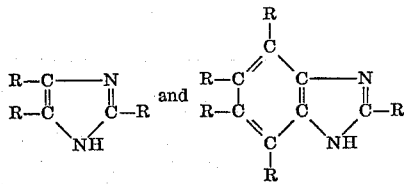

respectively, wherein R is selected from hydrogen atoms, halogen atoms, or an organic radical, such as a hydrocarbon radical or a substituted hydrocarbon radical, for example, the ester, ether, amide, imide, amino halogen, or mercapto substituted hydrocarbon radicals. The acid portion of the salt is selected from an acid, such as phosphoric, acetic, lactic, formic, propionic and the like. Especially preferred imidazoles are those wherein the substituent is hydrogen or a hydrocarbon radical and preferably an alkyl, alkenyl, cycloalkyl, cycloalkenyl, aryl, alkaryl or arylalkyl radicals, and particularly those containing no more than 15 carbon atoms and wherein the acid is selected from monocarboxylic acids having from 1 to 8 carbon atoms, lactic, and phosphoric acids, or polycarboxylic acids such as phthalic, adipic and tartaric acids.

A more detailed description of the chemistry of the imidazoles and benzimidazoles including their properties and structural formulas is found in the book by Klaus Hofmann entitled "Imidazole and Its Derivatives" published by Interscience Publishers, Inc., New York (1953). Examples of imidazole salts include, among others, the acetate, formate, lactate, adipate, phthalate and phosphate salts of imidazole, benzimidazole and substituted imidazoles. Examples of suitable substituted imidazoles include:

2-methylimidazole,
2-ethyl-4-methylimidazole,
2-cyclohexyl-4-methylimidazole,
4-butyl-5-ethylimidazole,
2-butoxy-4-allylimidazole,
2-carboethoxybutyl-4-methylimidazole;
2-octyl-4-hexylimidazole,
2-methyl-5-ethylimidazole,
2-ethyl-4-(2-ethylamino)imidazole,
2-methyl-4-mercaptoethylimidazole,
2,5-chloro-4-ethylimidazole, and mixtures thereof. Especially preferred are the alkyl-substituted imidazole acetates, lactates, phthalates, and adipates, wherein the alkyl groups contain not more than 8 carbon atoms each, or mixtures thereof, and particularly preferred are 2-ethyl-4-methylimidazole acetate, 2-ethyl-4-methylimidazole lactate, 2-methylimidazole acetate, 2-methylimidazole lactate, imidazole acetate, imidazole lactate, and mixtures thereof.

Suitable tertiary amine borates can be prepared by reacting at room temperature a tertiary amine with a borate such as, for example, methyl borate or triethyl borate. Suitable tertiary amine borates include, among others, trimethylamine borate, triethylamine borate, triethanolamine borate, triisopropanolamine borate, benzyldimethylamine borate, alpha-methylbenzyl dimethylamine borate, dimethylamino-methyl phenol borate, and tridimethyl aminomethyl phenol borate. Particularly preferred is triethanolamine borate.

The tertiary amines that may be used as catalysts are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanol amine, triethylamine, tributylamine, dimethyl benzylamine, triphenylamine, tricyclohexyl amine, pyridine, quinoline, and the like. Preferred amines are the trialkyl, tricycloalkyl and triaryl amines, such as triethylamine, triphenylamine, tri(2,3-dimethylcyclohexyl)amine, and the alkyl dialkanol amines, such as methyl diethanol amines and the trialkanolamines such as triethanolamine. Weak tertiary amines, e.g., amines that in aqueous solutions give a pH less than 10, are particularly preferred.

Especially preferred tertiary amine accelerators are benzyldimethylamine and tris-dimethylaminomethyl phenol (DMP-30—Rohm and Haas Company) because of the excellent results obtained when used in the present process.

The present catalysts (accelerators), if employed, are generally employed in amounts varying from about 0.01% to 5% by weight of the reactants, with from 0.05 to 3% being generally preferred.

The solid adducts of the present invention are particularly suitable for use in the preparation of powdered compositions, for use in molding compositions or in fluidized bed systems. Suitable molding and fluidized bed processes which can be performed utilizing the instant condensates are adequately described in U.S. 3,336,251, U.S. 3,362,922, and U.S. 3,477,971 among many others.

The compositions are also particularly suited for use in the formation of coatings as by spraying, dipping, etc., onto heated articles, and then subjecting the coated article to post curing conditions.

Suitable fillers which may be employed in such fluidized bed or molding operations include, among others, aluminum powder, mica, bentonites, clays, synthetic resins and polymers, rubbers, ignited $Al_2O_3$, short-fiber asbestos, wood flour, carbon black, silica, zinc dust, talc and the like. A large number of fillers are available commercially in particle sizes from about 0.1 microns upward.

The quantity of fillers used is dependent upon many factors such as cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr., and the heavier fillers may be employed up to about 150 phrs. In general, however, in order to optimize raw material costs without minimizing coating properties, the ratio of filler to polyepoxide ranges from about 10 to about 60 phr.

It is generally desirable, although not necessary, to employ a thixotropic agent to prevent dripping or sagging at high film build. Any of the thixotropic agents normally used in the art are suitable for use in the present compositions, including silica aerogels, bentonite clays and their derivatives, castor oil derivatives and the like.

Solutions of the new adducts in solvents such as hydrocarbons, ketones, ethers and the like may also be used for a great many different applications. They may be used, for example, as adhesives and bonding materials for a variety of different surfaces, such as metal, wood, ceramics, cement, plaster, and the like. In these applications, the solution composition is placed alone or in combination with other liquid adhesive materials between the desired surfaces to be adhered together and pressure and heat then applied to effect the cure. Preferred temperatures range from about 250° F. to about 450° F.

Because of their ability to be cured quickly at moderate temperatures, the solution compositions are particularly suited for use in the preparation of coating and impregnating compositions. In this application, the compositions are sprayed, brushed, dipped or otherwise applied to the desired surface and the coating then heated by suitable means to a curing temperature of preferably 250° F. to 450° F. for a few minutes. Such a procedure may be used to coat various types of surfaces, such as metal surface, wood, cement, roadways, walkways, and the like.

The solution compositions are particularly useful for filament winding applications. In the application the filaments such as, for example, glass fibers are passed into and through the liquid composition of the invention and then wound onto the desired mandrel or form and the formed unit allowed to cure by application of heat. The great advantage of the new compositions in this application is the fact that the composition can be cured at moderate temperatures and their use would thus not effect heat sensitive material. For example, the rubber lining of missile cases are heat sensitive and would be affected by use of high temperatures for curing material thereon. The new compositions thus could be used for the filament winding of these cases where the winding is directly on the liner.

The above-described systems are also useful in the preparation of laminates. In this application, the sheets of fibrous material are first impregnated with the composition of the invention. The sheets of fibrous material are impregnated with the mixture by spreading it thereon or by dipping or otherwise immersing in the impregnant.

The solvent is conveniently removed by evaporation and the mixture is cured to the fusible resin state. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos, mica flakes, cotton bats, duck muslin, canvas, synthetic fibers such as nylon, Dacron and the like. It is usually preferred to utilize woven glass cloth that has been given prior treatment with the well known finishing or sizing agents therefor, such as chrome methacrylate or vinyl trichlorosilane.

To illustrate the manner in which the present invention may be carried out, the following examples are given. The examples are given only to illustrate the invention and are not to be regarded as limiting the scope of the invention in any way. Unless otherwise indicated, parts and percentages disclosed in the examples are by weight. The polyethers referred to by letter, such as Polyether A, are those disclosed in U.S. 2,633,458. Percent w. as used herein refers to percent by weight.

Example I

This example illustrates the preparation of several epoxy-containing condensates of the present invention, utilizing an epoxy/phenolic OH ratio of 2.5, 2.6, 2.75, and 3.0.

Into a 150-ml. glass beaker the following components were mixed in various proportions so that the above epoxy/ phenolic OH ratios were observed in separate runs to produce about 100 grams of condensate in each run:

(1) Polyepoxide A [glycidyl polyether of 2,2-bis(4-hydroxyphenyl)propane having an average molecular weight of about 380 and an equivalent weight of about 170-190],
(2) alpha,alpha,omega,omega - tetrakis(hydroxyphenyl) ethane, i.e., tetraphenylolethane (TPE), and
(3) 0.05% by weight based on the weight of Polyepoxide A and TPE of triphenyl phosphine.

The reaction mixture was then heated on a hot plate to a temperature of 150° C. at which time the reaction mass exhibited a slight exotherm to 170–190° C. The mass was maintained at this temperature for an additional hour.

The resulting condensates exhibited properties as tabulated in Table I.

TABLE I

| | Ratio of epoxy/OH | M.P., ° C. | WPE Calculated | WPE Found |
|---|---|---|---|---|
| Condensate: | | | | |
| A | 3.0 | 48–55 | 345 | 341 |
| B | 2.75 | 57–68 | 366 | 365 |
| C | 2.6 | 60–73 | 382 | 374 |
| D | 2.5 | Gelled | | |

Example II

This example illustrates the preparation of 60 pounds of condensate utilizing an epoxy/phenolic OH ratio of 3.

Into a 14-gallon, jacketed stainless steel kettle the components described in Example I were mixed in the necessary proportions so that the 3:1 epoxy/phenolic OH ratio was observed.

The reaction mixture was then heated utilizing 15 p.s.i.g. steam, and after 2½ hours, the reaction mixture reached 130° C. Due to the high viscosity of the mixture at this temperature, the mixture was allowed to stir for only 30 minutes at which time the temperature had dropped to 132° C. from the peak exotherm temperature of 142° C. It will be appreciated that an alternate procedure comprises heating the reaction mixture rapidly, i.e., in 30–45 minutes, to the initiating temperature of 130° C., allowing the reaction to exotherm (usually 160–170° C.) and stirring continued for an additional hour at 160–170° C. Related properties were obtained for the condensate.

Example III

This example illustrates the use of Bisphenol A (BPA) in combination with alpha,alpha,omega,omega-tetrakis(hydroxyphenyl)ethane (TPE) to produce condensates according to the present invention.

The procedure of Example I was essentially followed wherein Polyepoxide A and alpha,alpha,omega,omega-tetrakis(hydroxyphenyl)ethane (TPE) were reacted in an equivalent ratio of 3:1 and various amounts of Bisphenol A were added to the reaction mixture. The resulting condensates had properties tabulated in Table II.

TABLE II

| Polyepoxide/TPE (equiv.) | 3/1 | 3/1 | 3/1 | 3/1 |
|---|---|---|---|---|
| BPA/TPE (equiv.) | | 0.1/1 | 0.175/1 | 0.25/1 |
| M.P., ° C. | 48–55 | 51–60 | 53–63 | 60–70 |
| WPE | 341 | | 386 | |
| HDT, ° C.ᵃ | 146 | | 132 | |

ᵃ Cured 5′ at 300° F. with 5.2 hpr. monoimidazole adipate.

This data clearly shows that the addition of BPA increased the melting point of the condensate.

Example IV

This example illustrates the use of Bisphenol S (BPS) in combination with tetraphenylolethane to produce condensates according to the present invention.

The procedure of Example I was essentially followed wherein Polyepoxide A and TPE were reacted in an equivalent ratio of 3:1 and BPS was added to the reaction mixture. The resulting condensate had the properties tabulated in the following Table III.

TABLE III

| | |
|---|---|
| Polyepoxide/TPE (Equiv.) | 3/1 |
| BPS/TPE (Equiv.) | 0.216/1 |
| M.P., °C. | 67 |
| HDT, °C.[1] | 134 |

[1] Cured 5' at 300° F. with 4.7 phr. imidazole adipate.

Example V

This example illustrates the storage stability at 200° F. compared to a proprietary resin in a molding composition.

A precondensate was prepared by reacting Polyepoxide A and TPE in the equivalent ratio of epoxy to phenolic OH of 3:1 in the presence of 0.05% by weight of triphenyl phosphine. The precondensate had a melting point of about 48–55° C. and a WPE of 341. The precondensate was cured with 5.1 phr. (parts per 100 parts by weight of resin condensate) of 2-methylimidazole tartrate. A molding composition was also prepared wherein the precondensate was replaced with Polyepoxide X, a solid epoxy resin consisting of a mixture of isomers and homologues having an idealized structure:

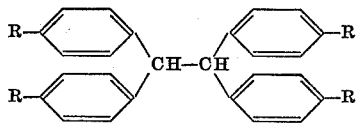

wherein R is

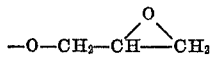

The properties of the resulting molding compositions are tabulated in Table IV.

TABLE IV

| Properties | Polyepoxide X | Precondensate |
|---|---|---|
| HDT, °C. | | |
| 2 min./335° F. | 94 | 119 |
| 2 min./370° F. | 120 | 113 |
| Spiral flow, inches | 21 | 24 |
| Spiral flow, retention at 200° F., percent after— | | |
| ½ hour | 100 | 100 |
| 1 hour | 94 | 100 |
| 2 hours | 92 | 95 |

Example VI

This example illustrates the properties of molding compounds prepared from the precondensate resin of Polyepoxide A and alpha,alpha,omega,omega-tetrakis(hydroxyphenyl)ethane (TPE) cured with various amounts of monoimidazole adipate expressed in phr. (parts per 100 parts by weight of precondensate resin).

The molding composition formulation was as follows:

| | Wt. percent |
|---|---|
| Resin, catalyst, and Cab-O-Sil M-5 [a] | 28 |
| Silica 219 (fine silica sand) | 70 |
| Carnauba wax, refined | 2 |

[a] Cab-O-Sil is pyrogenic silica and is used in 2 phr.

The results of the use of various amounts of monoimidazole adipate curing agent to cure a precondensate prepared by reacting Polyepoxide A and TPE in an equivalent ratio of epoxy/OH of 3:1 in the presence of 0.05% triphenyl phosphine is tabulated in Table V.

TABLE V

| | | | | |
|---|---|---|---|---|
| Monoimidazole adipate, phr | 5.2 | 4.0 | 3.0 | 2.0 |
| Gel time (150° C. hot plate), sec. | 55 | 55 | 70 | 85 |
| Spiral flow, inches | 10–12 | 10 | 12 | 14 |
| HDT, °C.: | | | | |
| Cure schedule at 300° F.: | | | | |
| 5 minutes | 143–146 | 143–146 | 141–148 | 120–132 |
| 2 minutes | 140–143 | 138–144 | 110–122 | 78–90 |
| 1.5 minutes | 140 | 123–132 | | |
| 1.25 minutes | 124–140 | | | |
| Cure schedule at 303° F.: | | | | |
| 5 minutes | 125 | | | |
| 2 minutes | 125–128 | 127–129 | | |
| 1.5 minutes | 129–133 | 129–133 | | |
| 1.25 minutes | 125 | 125–127 | | |
| 1.0 minutes | | 122 | | |
| 0.75 minute | 132 | 121–126 | | |
| 0.5 minute | 125–129 | | | |

Example VII

The procedures of Example VI were substantially repeated wherein diimidazole phthalate monohydrate is used as a curing agent. The results are tabulated in Table VI.

TABLE VI

| | | | | | |
|---|---|---|---|---|---|
| Diimidazole phthalate monohydrate, phr | 5.9 | 4.5 | 3.0 | 2.0 | 1.0 |
| Gel time (150° C. hot plate), sec. | | | 55 | 75 | 95 |
| Spiral flow, inches | 12 | 12 | 10 | 13 | 16 |
| HDT, °C.: Cure schedule at 300° F.: | | | | | |
| 5 minutes | 150–153 | 155 | 153–155 | 149–158 | 95 |
| 3 minutes | 150 | 150 | | | |
| 2 minutes | 150 | 150 | 150 | 125 | 63 |
| 1.5 minutes | 146–150 | 149 | | | |
| 1.25 minutes | 147–149 | 148 | | | |
| 1.0 minute | 141–145 | 148 | | | |

Example VIII

The procedures of Example VI were substantially repeated wherein 2-methylimidazole tartrate (2–MIT) is used as the curing agent. The results are tabulated in Table VII.

TABLE VII

| | | |
|---|---|---|
| 2-MIT, phr | 6.7 | 5.1 |
| Spiral flow, inches at— | | |
| 300° F. | 27 | 24 |
| 350° F. | 27 | |
| 375° F. | 20 | |
| HDT, °C.: | | |
| 5 min. at 300° F. | 134 | |
| 2 min. at 303° F. | 128–140 | 119 |
| 5 min. at 330° F. | 141–146 | |
| 2 min. at 350° F. | 135 | |
| 2 min. at 375° F. | 119 | 113 |

Example IX

This example illustrates the use of phthalic anhydride and methylene dianiline as curing agents for the instant precondensates in typical molding compound formulations. The precondensate resin was prepared as in Example I wherein the epoxy/phenolic OH ratio was 3.0.

The properties of the resulting molding compounds are tabulated in Table VIII.

TABLE VIII.—COMPOSITION AND PROPERTIES OF MOLDING COMPOUNDS

| Item | Molding composition, percent w. | | |
|---|---|---|---|
| | I | II | III |
| Precondensate resin | 28.8 | 25.9 | 25.9 |
| Phthalic anhydride | 10.4 | | |
| Methylene dianiline | | 3.6 | 3.6 |
| DABCO [1] | 0.8 | | |
| Salicylic acid | | 0.5 | 0.5 |
| Carnauba wax | 2.0 | 2.0 | |
| Zinc stearate | | | 2.0 |
| Silica powder | 58.0 | 68.0 | 68.0 |
| Total | 100.0 | 100.0 | 100.0 |
| Spiral flow, inches [2] | 18 | 9 | 5 |
| HDT, °C. [3] | 144 | 111 | 116 |

[1] Triethylene diamine, Houdry Process and Chemical Company.
[2] Epoxy Molding Materials Institute, EMMI 1-66.
[3] Cured 5 minutes at 300° F. and 1,000 p.s.i.

Example X

This example illustrates the improvement in heat deflection temperature (HDT) of a precondensate resin, derived from Polyepoxide A, aniline, and meta-aminophenol, wherein 25% by weight is replaced by a TPE precondensate resin as typified by Example I-B. The comparative results are as follows:

|  | Control | Modified resin |
|---|---|---|
| Polyepoxide A/aniline/m-aminophenol (percent by wt.) | 100 | 75 |
| TPE precondensate from Example I-B | | 25 |
| HDT, °C.[1] | 100 | 122 |

[1] Cured 2′ at 300° F. with 3.0 phr. imidazole adipate.

I claim as my invention:

1. An acetone-soluble, highly reactive, epoxy-containing condensate prepared by mixing and reacting (1) a polyepoxide possessing more than one vicinal epoxy group with (2) at least one alpha,alpha,omega,omega-tetrakis-(hydroxyphenyl)alkane, said polyepoxide and alpha,alpha-omega,omega-tetrakis(hydroxyphenyl)alkane being employed in amounts to provide an epoxy to phenolic OH ratio of at least 2.6:1, in the presence of (3) a catalytic amount of a catalyst selected from the group consisting of hydrocarbon phosphonium halide of the formula

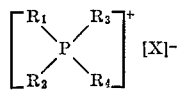

wherein X is a halogen atom and $R_1$, $R_2$, $R_3$ and $R_4$ are the same or different hydrocarbon radicals containing from 1 to 18 carbon atoms and organic phosphines of the general formula $P(R)_3$ wherein at least one R is a hydrocarbon radical and the R's are hydrogen or hydrocarbon radicals, said hydrocarbon radicals having no more than 25 carbon atoms.

2. A condensate as in claim 1 wherein the polyepoxide is a glycidyl polyether of a polyhydric phenol or polyhydric alcohol.

3. A condensate as in claim 1 wherein the alpha,alpha,omega,omega - tetrakis(hydroxyphenyl)alkane is 1,1,2,2-tetrakis(hydroxyphenyl)ethane.

4. An infusible, insoluble composition obtained by reacting the epoxy-containing condensate of claim 1 with a curing amount of an epoxy curing agent.

5. A composition as in claim 4 wherein the epoxy curing agent is a salt of (a) an imidazole compound and (b) a polycarboxylic acid.

6. A composition as in claim 5 wherein the imidazole salt is monoimidazole adipate.

7. A composition as in claim 5 wherein the imidazole salt is diimidazole phthalate monohydrate.

8. A composition as in claim 1 wherein the organic phosphine is triphenyl phosphine.

9. A composition as in claim 1 wherein up to 20% of the alpha,alpha,omega,omega - tetrakis(hydroxyphenyl)alkane is replaced with at least one other phenol on an equivalent basis.

10. A composition as in claim 9 wherein the phenol is 2,2-bis(4-hydroxyphenyl)propane.

References Cited
UNITED STATES PATENTS

| 3,477,990 | 11/1969 | Dante et al. | 260—47 |
| 3,547,881 | 12/1970 | Mueller et al. | 260—47 |
| 3,356,645 | 12/1967 | Warren | 260—47 |

WILLIAM H. SHORT, Primary Examiner

T. E. PERTILLA, Assistant Examiner

U.S. Cl. X.R.

117—161 ZB; 161—184; 260—18 Ep, 30.4 Ep, 32.2 Ep, 33.6 Ep, 37 Ep, 47 EN